United States Patent Office 3,107,146
Patented Oct. 15, 1963

3,107,146
METHOD OF PRODUCING HYDROGEN CYANIDE
Kazuo Sasaki, Kamihanazawa, Yonezawa City, Japan, assignor to Toyo Koatsu Industries, Incorporated, Tokyo, Japan, a corporation of Japan
No Drawing. Filed Jan. 26, 1961, Ser. No. 84,975
Claims priority, application Japan Jan. 28, 1960
4 Claims. (Cl. 23—151)

This invention relates generally to an improved catalytic method for preparing hydrocyanic acid from a mixed gas comprising a saturated hydrocarbon and ammonia. More particularly, it relates to a novel catalyst and methods for preparing same and to the method for preparing hydrocyanic acid over said novel catalyst.

It is well-known that the use of a catalyst composed exclusively of aluminium oxide demonstrates comparatively good results in preparing hydrocyanic acid from a mixed gas of methane and ammonia as represented by the equation $CH_4 + NH_3 = HCN + 3H_2$. Although such a catalyst demonstrates good effects in catalyzing the reaction, if it is prepared with much care, it will inevitably be rendered less active or inactive by the growth of crystal grains on its surface during catalytic contact. Such a drawback inevitably results in a decrease in the yield of hydrocyanic acid and in general an inefficient reaction.

It is a principal object of the invention to provide a novel catalyst of improved activity for use in the manufacture of hydrocyanic acid, such that the growth of crystal grains on the surface of the catalyst is inhibited and a high porosity on the surface of the catalyst is continuously developed while the catalyst is being used.

Another object is the provision of methods for making said novel catalyst.

Another object of the present invention is to provide an improved method for preparing hydrocyanic acid from a mixed gas of methane and ammonia over said novel catalyst.

A still further object of the invention is to provide a novel catalyst, and a process employing it, giving a high yield of hydrocyanic acid and minimizing the decomposition of ammonia and the hydrocyanic acid produced.

I have found that the admixture of zinc oxide with the aluminium oxide catalyst inhibits the lowering of the activity of the aluminium oxide catalyst during use and further that the use of such a catalyst results in minimizing the reduction of hydrocyanic acid yield which takes place when an aluminuim oxide catalyst is employed alone. The reason for this unexpected result is believed to be that the zinc oxide admixed with the aluminium oxide is gradually reduced by the methane into metallic zinc particles during the catalytic contact and that the zinc particles so formed are evaporated from the surface of the catalyst under the high temperatures of the reaction. Thus, the growth of crystal grains of aluminium oxide is inhibited and simultaneously the catalyst develops a high porosity and increases in contact surface area. The resulting excellent activity also minimizes the decomposition of not only the ammonia as a starting material but also the hydrocyanic end product.

The amount of zinc oxide admixed with the aluminium oxide catalyst is not narrowly critical but should be commensurate with (a) a high conversion rate of ammonia and hydrocarbon into hydrocyanic acid; (b) minimization in the decomposition of the ammonia; (c) the desired mechanical strength of the catalyst. The following tables (Tables I and II) describe the relation between the Zn/Al (by weight) and the conversion rate of ammonia into hydrocyanic acid as well as the relation between the Zn/Al (by weight) and the decomposition rate of ammonia for a particular set of operating conditions in a hydrocyanic acid synthesis. Under the operating conditions of the runs described in Tables I and II, if the Zn/Al ratio (by weight) were below 0.04, there would be insufficient zinc oxide to form readily noticeable porosity in the catalyst; whereas if the Zn/Al ratio were above 76, such catalyst, containing so much zinc oxide, would result in being highly porous and coarse by the evaporation of the zinc oxide, and would inevitably become too low in mechanical strength.

TABLE I

Operational conditions.—The catalyst comprised ZnO and $Al_2O_3$; the reaction temperature was 1,050° C.; the size of the catalyst particles were 10–15 mesh each; the composition and the space velocity of the gaseous starting material were the same in all instances.

| Parts Zn per 100 parts Al (by weight) | Percent $NH_3$ converted to $HCN$ [1] | Percent $NH_3$ decomposed [1] |
|---|---|---|
| 5 | 64 | 13 |
| 10 | 65 | 11 |
| 20 | 70 | 10 |
| 30 | 75 | 11 |
| 50 | 73 | 11 |
| 75 | 74 | 12 |
| 85 | 72 | 15 |

[1] Based on the initial amount of $NH_3$ in the gaseous starting materials.

TABLE II

Operational conditions.—The catalyst comprised ZnO, $Al_2O_3$ and MgO; the reaction temperature was 1,050° C.; the size of the catalyst particles was 5–10 mesh each; the composition and the space velocity of the gaseous starting material were the same in all instances. The catalyst used had a Mg/Al ratio of 3/7 by weight.

| Parts Zn per 100 parts Al | Percent $NH_3$ converted to $HCN$ [1] | Percent $NH_3$ decomposed [1] |
|---|---|---|
| 5 | 67 | 12 |
| 10 | 68 | 10 |
| 20 | 71 | 8 |
| 50 | 72 | 9 |
| 70 | 71 | 8 |
| 75 | 68 | 10 |
| 80 | 65 | 11 |

[1] Based on the initial amount of $NH_3$ in the gaseous starting materials.

The catalyst according to the present invention is prepared in the manner hereinbelow specified. An aqueous solution comprising a selected salt of aluminium and a selected salt of zinc (the salts of both being selected commonly from the class of respective nitrates, chlorides and sulfates) in an amount hereinbefore specified, is poured in droplets into aqueous ammonia (or if necessary, the latter is poured in droplets into the former), thereby forming a mixed precipitate. If desired the precipitate is subjected to ageing to obtain better uniformity. Then the precipitate is washed, filtered, dried, comminuted, screened and finally calcined to 600–700° C. The use of a sulfate as a starting material necessitates a large amount of washing to remove substantially all of the sulfate. Accordingly, a nitrate, a chloride, or a mixture of both are preferably employed.

As seen from Table II, it should be noted that catalysts which comprise aluminium oxide and zinc oxide (additive) and which further comprise one or two more additives such as the acidic oxides consisting of magnesium oxide (MgO) and silicon dioxide ($SiO_2$) equally embody the objects and the purposes of this invention. Such difficultly reducible oxides are admixed in order to ameliorate the physical and mechanical properties of the catalyst. The amount of difficultly-reducible oxides corresponding to 10 to 40 parts by weight of the metal of said oxides per 100 parts by weight of aluminium. An admixture of this type by no means deteriorates the improvements attained by the admixture of zinc oxide. Hence such catalyst should be construed as being within the scope of the present invention.

The zinc content evaporated from the catalyst together with the product gas during catalytic contact can be recovered easily by introducing it into either water or an alkaline solution. When the zinc content is introduced into dilute sulphuric acid, hydrogen will be generated and subsequently the concentration of hydrogen in the product gas will be increased. The concentrated hydrogen can be utilised effectively in the synthesis of methanol or ammonia. The evaporated zinc also coats the walls of the reactor downstream from the catalyst bed and further reduces decomposition of ammonia and hydrocyanic acid by preventing direct contact with the walls of the reactors.

*Example I*

The catalyst was prepared in the following manner.

A 5 N aqueous ammonia solution at 10° C. was added in droplets to a 1.5 mol aqueous solution (at 20° C.) comprising aluminium nitrate and zinc nitrate, the ratio between the aluminium and the zinc content being 2:1 by weight, and the resulting precipitate was washed, filtered, dried, comminuted, screened to 5–7 mesh in size, and then was calcined for one hour at 700° C. Methane and ammonia were fed to a reactor in an amount corresponding to a molecular ratio of 1:0.9 and they were caused to react over the catalyst prepared above at a temperature of 950° C., a pressure of 780 mm. Hg and a space velocity of 1500 1/1.·hr. A 75% conversion rate into hydrocyanic acid was attained based upon the ammonia feed. The catalyst did not lower in activity over a period of several hours' continuous use. The decomposition rate of ammonia was not higher than 10% of the ammonia feed. For the purpose of comparison a similar operation was carried out except that the catalyst comprised aluminium oxide exclusively. In this operation the conversion rate was below 70% and the decomposition rate was above 10%.

*Example II*

The catalyst was obtained in the following manner.

A 3 N aqueous ammonia solution at 10° C. was added in droplets to a 1 mol aqueous solution (at 25° C.) comprising aluminium chloride, magnesium chloride and zinc chloride, the ratio between the aluminum, magnesium and zinc contents being 10:3:2 by weight, and the resulting precipitate, after having been aged for 6 hours at 80° C., was washed, filtered, dried, comminuted, screened to 3–5 mesh in size, and then calcined for 1.5 hours at 750° C. Methane, ammonia and nitrogen were fed to a reactor in an amount corresponding to a molecular ratio of 1:1:0.2 and they were caused to react over the above catalyst at 1,000° C., 780 mm. Hg pressure and at a space velocity of 2,000 1./1.·hr. A 74–75% or more conversion rate into hydrocyanic acid was obtained based upon the ammonia feed. The catalyst did not become lower in activity over a period of 10 hours of continuous use. The decomposition rate of ammonia was not higher than 9% of the ammonia feed. For the sake of comparison, a similar operation was carried out except that the catalyst comprised aluminium oxide exclusively, whereby the conversion rate was below 70% and the decomposition rate was 12–15% or more.

The preferred amounts of zinc oxide and aluminium oxide in the novel catalysts of this invention are those in the range of zinc to aluminium content of 5 to 75 weight parts of zinc for each 100 weight parts of aluminium. Respective amounts of zinc oxide and aluminium oxide within this range have been found to provide a catalyst fulfilling the above-mentioned requirements of (1) a high conversion rate of HCN; (2) low decomposition of ammonia; and (3) adequate mechanical strength.

Other variations in the details of this invention can be made without departing from the principle thereof as set forth in the appended claims.

I claim:

1. In the process for preparing hydrocyanic acid by the gas-phase reaction of a saturated hydrocarbon and ammonia at high temperatures, that improvement comprising, carrying out said reaction in the presence of a catalyst consisting of an intimate admixture of aluminium oxide and zinc oxide in respective amounts corresponding to about 5 to 75 parts of zinc to 100 parts of aluminium by weight, said catalyst being formed by the calcination of the coprecipitate obtained by mixing an aqueous solution of aluminum and zinc salts and an aqueous ammonia solution.

2. In the process for preparing hydrocyanic acid by the gas-phase reaction of a saturated hydrocarbon and ammonia at high temperatures, that improvement comprising, carrying out said reaction in the presence of a catalyst consisting of an intimate admixture of aluminium oxide, zinc oxide, and metal oxide selected from the group consisting of magnesium oxide and silicon dioxide in respective amounts, corresponding to 5 to 75 parts of zinc to 100 parts of aluminium and 10 to 40 parts of the metal of said metal oxide to 100 parts of aluminium, said parts being by weight, said catalyst being formed by the calcination of the coprecipitate obtained by mixing an aqueous solution of aluminum and zinc salts and a salt of said metal oxide and an aqueous ammonia solution.

3. The improved method for prepring hydrocyanic acid as claimed in claim 1 wherein the saturated hydrocarbon is methane.

4. The improved method for preparing hydrocyanic acid as claimed in claim 2 wherein the saturated hydrocarbon is methane.

References Cited in the file of this patent

UNITED STATES PATENTS

| 2,920,940 | Kronacher et al. | Jan. 12, 1960 |

FOREIGN PATENTS

| 761,166 | Great Britain | Nov. 14, 1956 |
| 588,395 | Canada | Dec. 8, 1959 |